(12) United States Patent
Kondo et al.

(10) Patent No.: US 6,435,610 B2
(45) Date of Patent: Aug. 20, 2002

(54) VERTICAL MOVEMENT APPARATUS FOR VEHICLE SEAT

(75) Inventors: Yuichi Kondo; Yukifumi Yamada, both of Toyota; Naoaki Hoshihara, Aichi-ken, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 64 days.

(21) Appl. No.: 09/725,712

(22) Filed: Nov. 30, 2000

(30) Foreign Application Priority Data

Nov. 30, 1999 (JP) ............................................. 11-341193
Nov. 10, 2000 (JP) ....................................... 2000-344117

(51) Int. Cl.⁷ ................................................. B60N 2/02
(52) U.S. Cl. .................................. 297/284.11; 297/313
(58) Field of Search ............................ 297/284.11, 313, 297/411.38, 408

(56) References Cited

U.S. PATENT DOCUMENTS

| 4,652,049 A | * | 3/1987 | Maruyama et al. | ......... 297/313 |
|---|---|---|---|---|
| 4,693,513 A | * | 9/1987 | Heath | ..................... 297/284.11 |
| 4,753,479 A | * | 6/1988 | Hatsutta et al. | ............. 297/313 |
| 5,362,128 A | * | 11/1994 | Wildern, IV | ........... 297/284.11 |
| 5,380,063 A | * | 1/1995 | Dauphin | ................ 297/284.11 |

FOREIGN PATENT DOCUMENTS

| JP | 160325 | * | 7/1986 | ............ 297/284.11 |
|---|---|---|---|---|
| JP | 10-338063 | | 12/1998 | |

* cited by examiner

*Primary Examiner*—Peter R. Brown
(74) *Attorney, Agent, or Firm*—Burns, Doane, Swecker & Mathis, LLP

(57) ABSTRACT

A vertical movement apparatus for a vehicle seat includes a first bracket adapted to be secured on a floor side member, a second bracket arranged to be adjustable relative to the first bracket, a sector gear disposed between the first bracket and the second bracket, and a braking mechanism having a pinion gear that meshes with the sector gear. The first bracket and the second bracket are pivotally connected to each other and the sector gear is pivotally connected to the second bracket and engages the first bracket via a slide member secured on the sector gear.

14 Claims, 7 Drawing Sheets

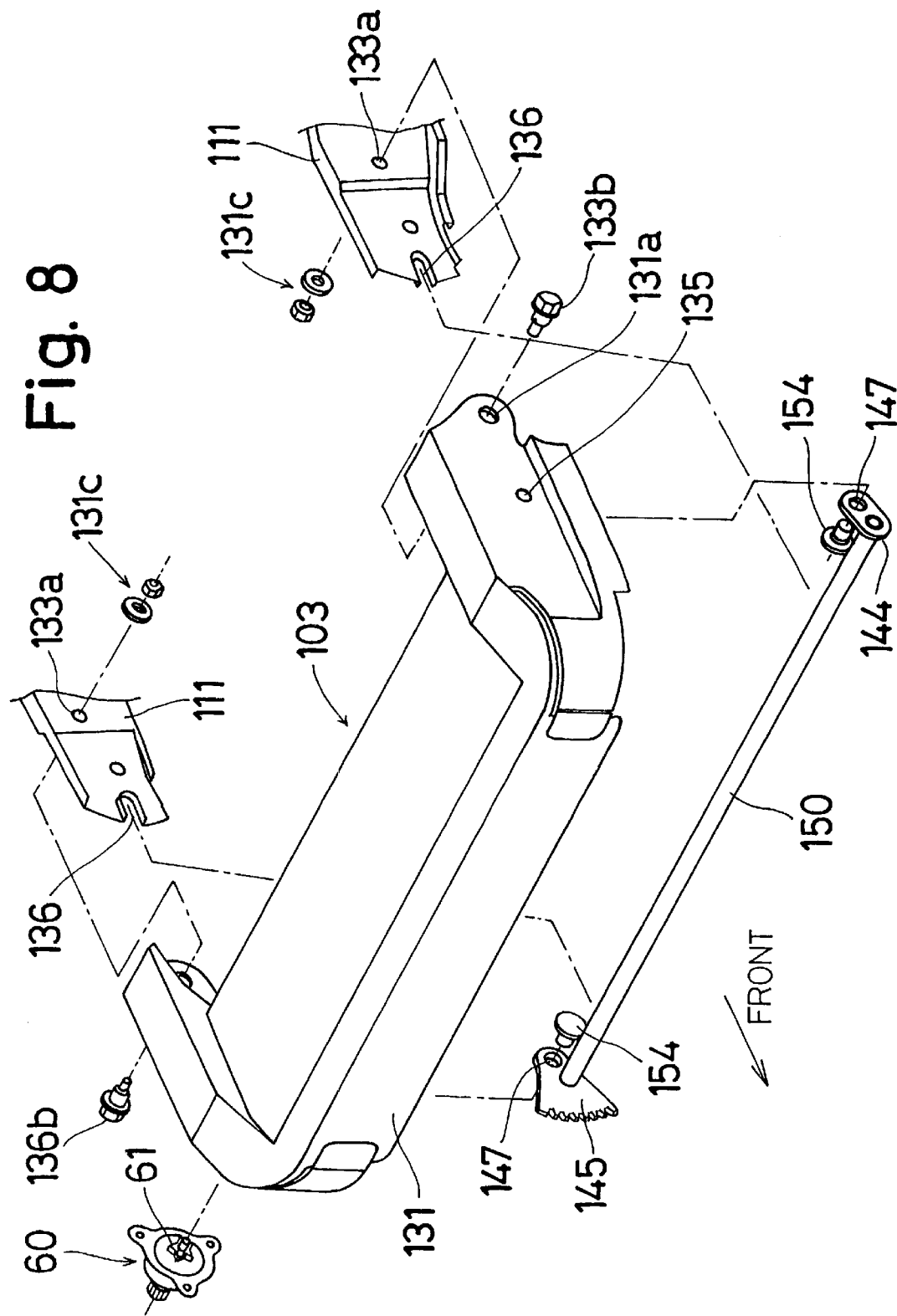

VERTICAL MOVEMENT APPARATUS FOR VEHICLE SEAT

This application is based on and claims priority under 35 U.S.C. §119 with respect to Japanese Application No. 11-341193 filed on Nov. 30, 1999 and Japanese Application No. 2000-344117 filed on Nov. 10, 2000, the entire content of both of which is incorporated herein by reference.

FIELD OF THE INVENTION

The present invention generally relates to a vehicle seat. More particularly, the present invention pertains to a vertical movement apparatus for a vehicle seat.

BACKGROUND OF THE INVENTION

A known vertical movement apparatus for a vehicle seat is disclosed in Unexamined Published Japanese Patent Application (Kokai) No. H10(1998)-338063. The vertical movement apparatus described in this document includes many links operatively assembled by many pivot pins for achieving the necessary operation and vertical positioning of the seat. The pivot pins are usually fixed on the device frame by a partial press deforming process, a so called riveting process. To assemble this known apparatus, the apparatus together with the heavy and large sized seat frame is set on the riveting machine, with the setting position of the overall structure being changed for securing each pin. The large number of parts and the difficulty associated with the riveting assembly process increase the manufacturing cost of the apparatus.

In light of the foregoing, a need exists for a vertical movement apparatus for a vehicle seat that is not as susceptible to the same disadvantages and drawbacks as those described above.

A need also exists for a vertical movement apparatus for a vehicle seat in which the number of linkage parts and pivot pins is minimized.

A still further need exists for a vertical movement apparatus for a vehicle seat that reduces or eliminates the need for a riveting process to attach the vertical movement apparatus to a vehicle seat.

SUMMARY OF THE INVENTION

According to one aspect of the present invention, a vertical movement apparatus for a vehicle seat includes a first bracket adapted to be secured on a floor side member, a second bracket arranged to be adjustable relative to the first bracket, a sector gear disposed between the first bracket and the second-bracket, and a braking mechanism having a pinion gear that meshes with the sector gear. The first bracket and the second bracket are pivotally connected to each other and the sector gear is pivotally connected to the second bracket and engages the first bracket via a slide member secured on the sector gear.

According to another aspect of the present invention, a vertical movement apparatus in a vehicle seat includes a first bracket adapted to be secured on a vehicle floor side member, a second bracket pivotally connected to the first bracket for pivoting movement relative to the first bracket, a rotatable sector gear mounted on a connecting shaft for pivoting movement relative to the second bracket, and a rotatable pinion gear meshing with the sector gear. A portion of either the sector gear or the connecting shaft engaging the first bracket to prevent the sector gear from pivoting relative to the first bracket.

BRIEF DESCRIPTION OF THE DRAWING FIGURES

The foregoing and additional features and characteristics of the present invention will become more apparent from the following detailed description considered with reference to the accompanying drawing figures in which like elements are designated by like reference numerals and wherein:

FIG. 8 is a perspective view of a vertical movement apparatus according to another embodiment of the present invention.

DETAILED DESCRIPTION OF THE INVENTION

Figure 1:
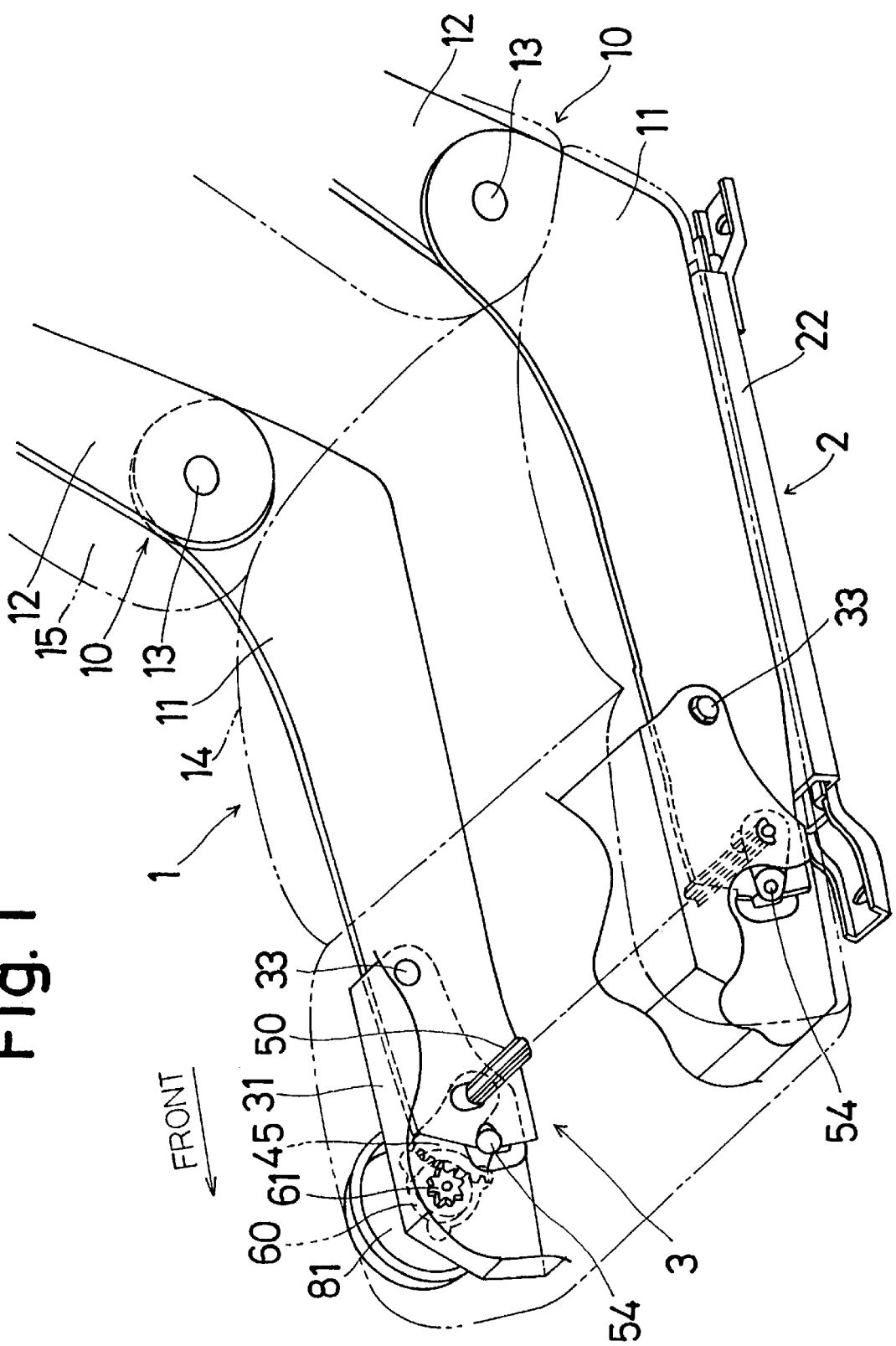
FIG. 1 is a perspective view of a seat assembly embodying a vertical movement apparatus according to one embodiment of the present invention.

Referring initially to FIG. 1, a vertical movement apparatus for a vehicle seat in accordance with the present invention is embodied in a vehicle seat assembly 1 (e.g., front seat assembly) that includes a seat back 15 and a seat cushion 14. The front seat assembly 1 includes a pair of reclining apparatus 10 positioned on opposite sides of the seat for adjusting the angle of the seat back 15. Each reclining apparatus 10 is comprised of a lower arm 11 or seat bracket which supports the seat cushion 14, and an upper arm 12 which supports the seat back 15. The lower am 11 of the reclining apparatus 10 is pivotally connected to the upper arm 12 by a hinge shaft 13.

Figure 2:
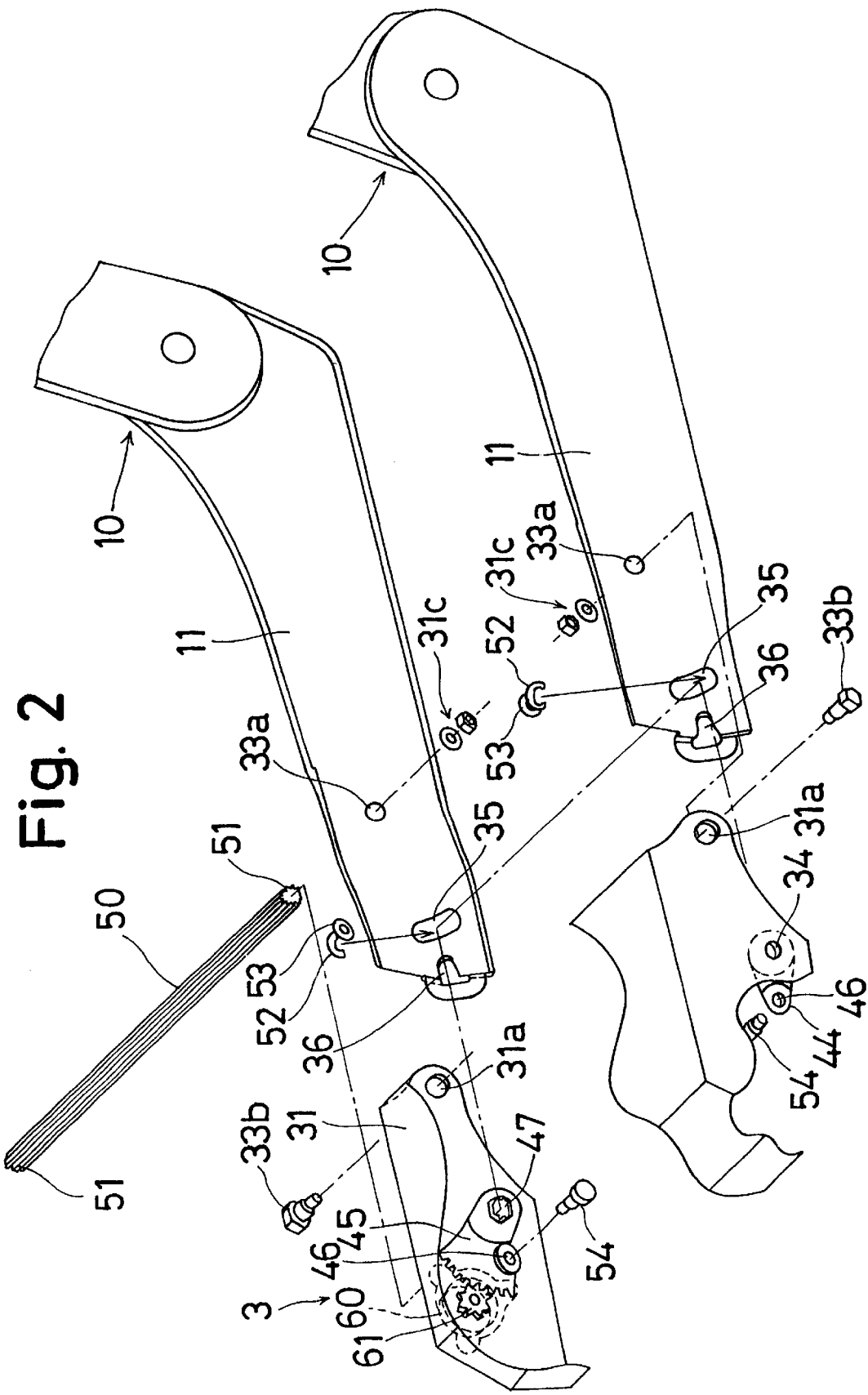
FIG. 2 is a perspective exploded view of parts of the seat assembly and vertical movement apparatus shown in FIG. 1.

As shown in FIGS. 1 and 2, a seat slide apparatus 2 is fixed on the vehicle floor (not specifically shown). The seat slide apparatus 2 permits the position of the overall seat assembly 1 to be adjusted in the back and forth direction.

A lock mechanism (not specifically shown) is provided between the upper arm 12 and the lower arm 11 so that the angle between the lower and upper arms 11, 12 forming each pair of arms is adjustable. The lower arm 11 is secured on an upper rail 22 of the seat slide apparatus 2. A hinge portion or hinge pin 33 is provided on the front portion of the lower arm 11, and a vertical bracket 31 is rotatably installed at the hinge portions 33 so that the vertical bracket 31 bridges the two lower arms 11 on both sides of the seat. A seat cushion frame (not specifically shown) and the seat cushion 14 are assembled or positioned on the vertical bracket 31.

Figure 3:
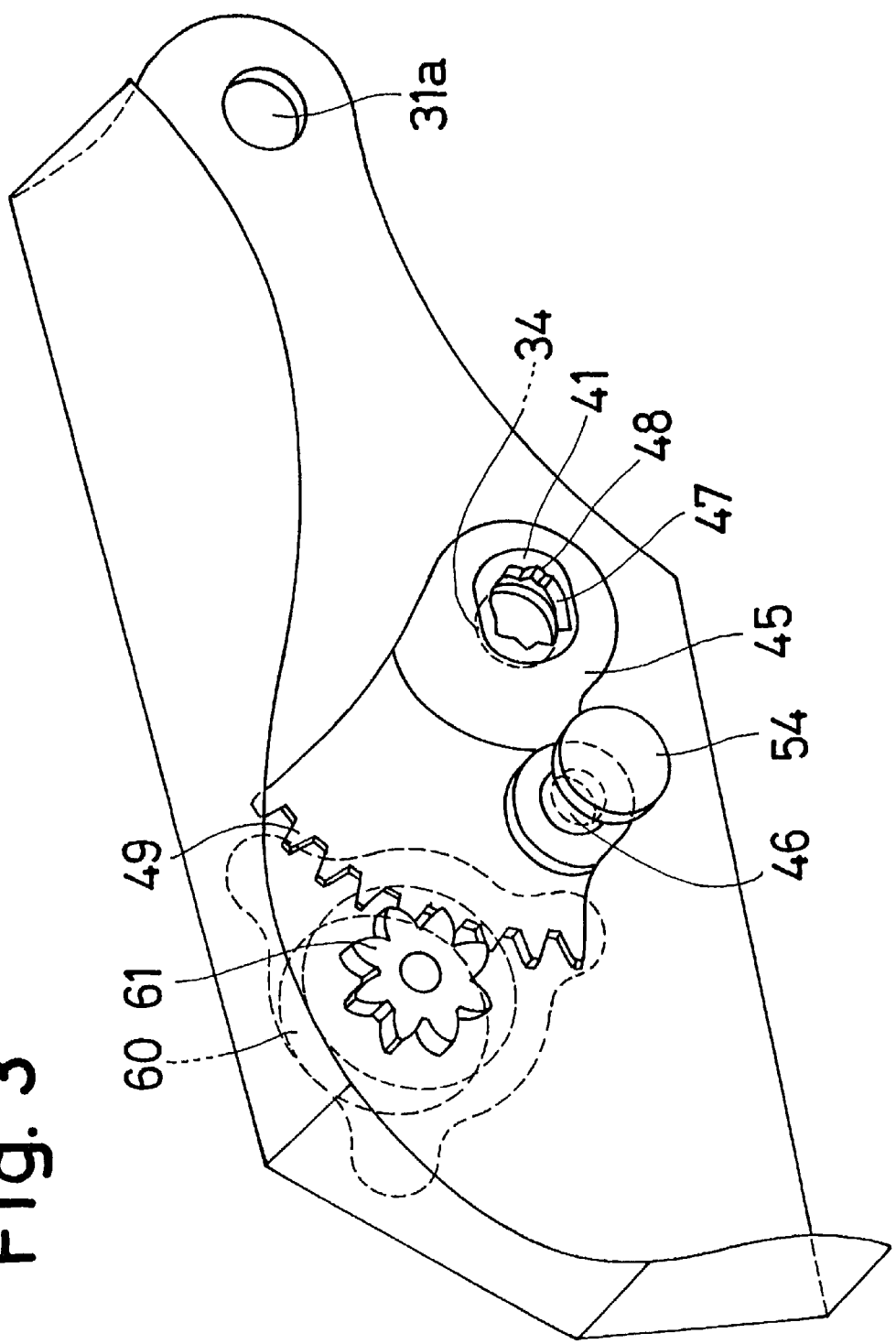
FIG. 3 is an enlarged perspective view of the adjusting mechanism used in the vertical movement apparatus shown in FIG. 1.

As shown in the FIG. 2, a hole 33a for the hinge portion 33 is formed on the lower arm 11. An elongated hole 35 having an arc-shaped configuration is formed in front of the hole 33a. The arc-shaped hole 35 is formed on a circle with the same center as the hole 33a. That is, the arc-shaped hole 35 is formed along a curved path having a center of curvature coincident with the center of the hole 33a. As shown in FIG. 3, a braking mechanism 60 is installed on one side of the vertical bracket 31. The braking mechanism 60 includes a pinion gear 61 which is adapted to be driven by operating a handle attached on the braking mechanism 60, however the pinion gear 61 cannot be driven by force applied on the pinion gear 61. This braking mechanism 60 is a well known mechanism in the form of a spring coupler braking mechanism.

Figure 4:
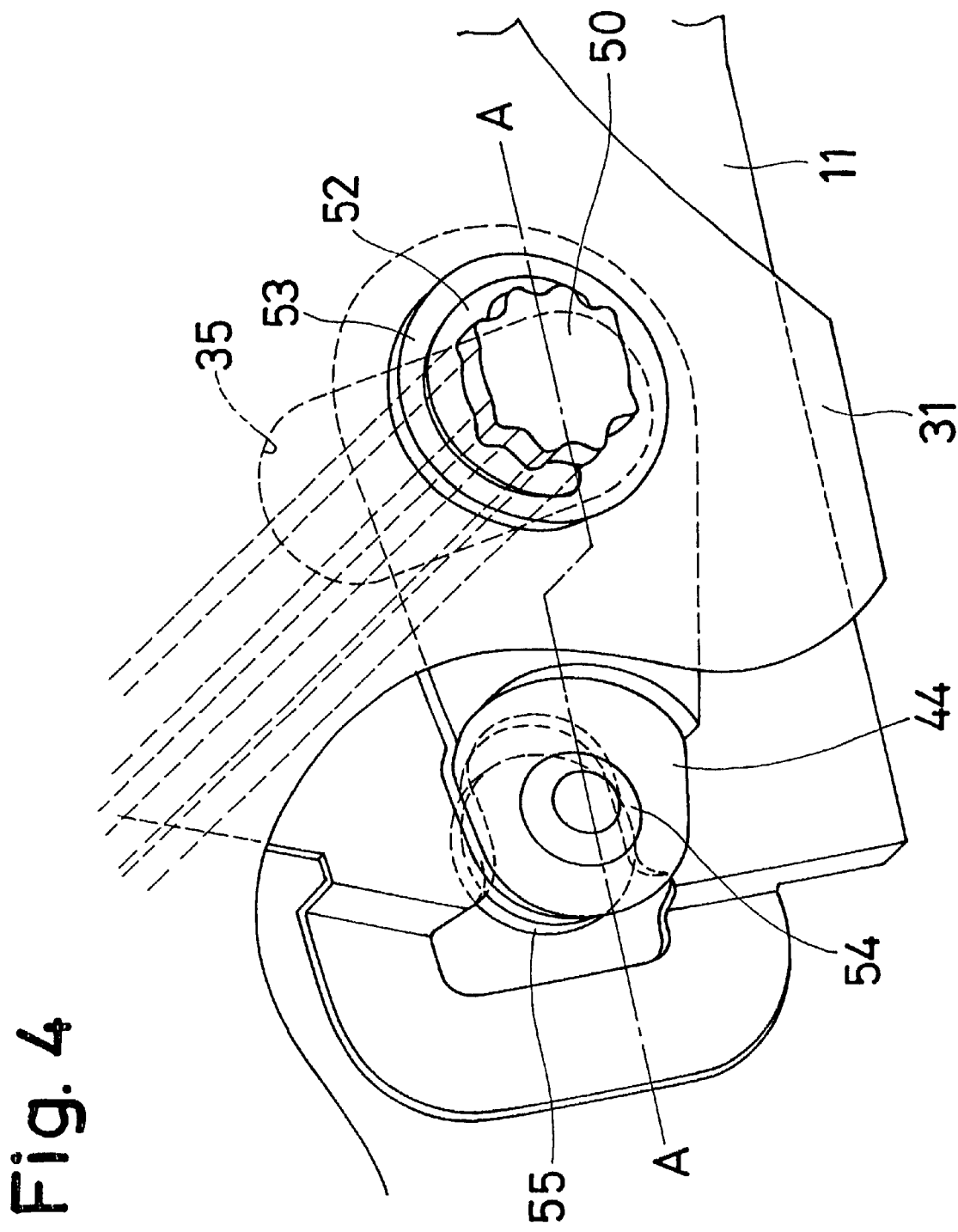
FIG. 4 is an enlarged perspective view of the link arm used in the vertical movement apparatus shown in FIG. 1.

As further shown in FIG. 3, the bracket 31 is provided with a sector gear 45 having a gear portion 49 that meshes with the pinion gear 61. A bush 41 is provided on the bracket at the center of the pitch circle of the gear portion 49 of the sector gear 45. The bush 41 includes a hole 47 having an inner surface provided with plural grooves extending laterally (i.e., parallel to the axis of the hole) to form a so-called female spline. Both sides of the vertical bracket 31 are provided with holes 34, as shown in FIG. 2, that possess the same center as the hole 47. A pin 54 extending horizontally is caulked in the hole 46 between the gear portion 49 and the hole 47. As shown in FIG. 4, on the side of the vertical bracket 31 opposite the side at which the sector gear 45 is fixed, an arm link 44 is installed. This arm link 44 is provided with a bush 41 and a pin 54 as illustrated in FIG. 7.

As shown in FIGS. 1, 2 and 3, a connecting shaft 50 penetrates or extends through the holes 34 formed on both sides of the vertical bracket 31, the holes 47 of the bushes 41 that are welded or otherwise secured on the section gear 45 and the arm link 44, and the elongated holes 35 on the lower arms 11. The outer surface of the connecting shaft 50 is provided with a male spline which meshes with the female spline formed on the inner surface of the bush 41 substantially without play so that the sector gear 45 and the arm link 44 rotate together. The diameter of the hole 34 is slightly larger than the diameter of the connecting shaft 50, and rotatably holds the connecting shaft 50 to function as bearing portions for the rotation of the sector gear 45 and the arm link 44 relative to the vertical bracket 31.

Figure 7:
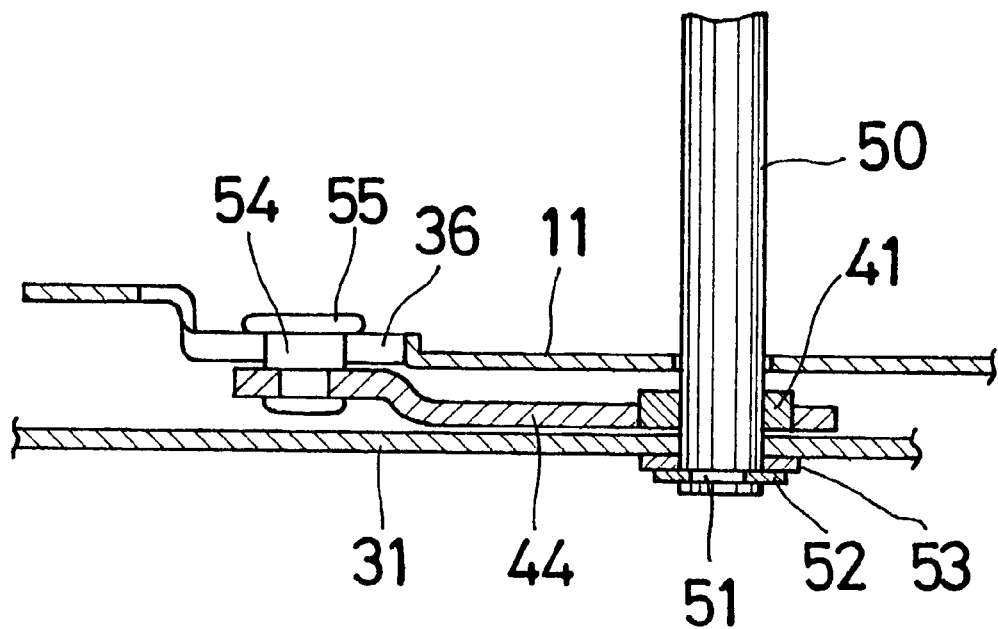
FIG. 7 is a cross sectional view of the arrangement shown in FIG. 4 taken along the section line VII—VII.

As shown in FIG. 7, both end portions of the connecting shaft 50 are provided with grooves 51 for receiving snap rings 52 and washers 53 so that the snap rings 52 and washers 53 are set on the connecting shaft 50. Horizontally extending and elongated holes 36 are formed on the front end portions of both lower arms 11. Respective pins 54 having a large diameter collar portion at one end and forming slide members are fixed on the sector gear 45 and the arm link 44. The holes 36 formed on the front end portions of the lower arms 11 are configured to be stepped and have an enlarged portion for accepting the pin 54 from the front side of the hole.

The process for assembling the vertical movement apparatus 3 to the lower arm 11 is as follows. First, the pins 33b are inserted into the holes 31a on both sides of the vertical bracket 31 and the holes 33a on the lower arms 11 on both sides of the seat 1. The pins 33b are then fastened using screw (or nut) and washer members 31c. The pins 33b establish the hinge portions 33 for the vertical bracket 31 and the lower arms 11.

Next, from one side of the vertical bracket 31, the connecting shaft 50 is inserted through the holes 47 of the bushes 41 of the link arm 44 and the sector gear 45, and the elongated holes 35 in the lower arms 11. Finally, the snap rings 52 and washers 53 are positioned in the grooves 51 (shown in FIG. 7) on the end portions of the connecting shaft 50. It can thus be appreciated that the assembly process associated with the vertical movement apparatus 3 of the present invention does not require a riveting process for attaching the vertical bracket 31, the connecting shaft 50 and the other parts on the lower arms 11 of the seat 1. Accordingly, the time consuming assembly associated with repetitively setting and changing the position of the large and heavy seat for riveting the many pins is eliminated. Thus, manufacturing costs can be reduced.

Figure 5:
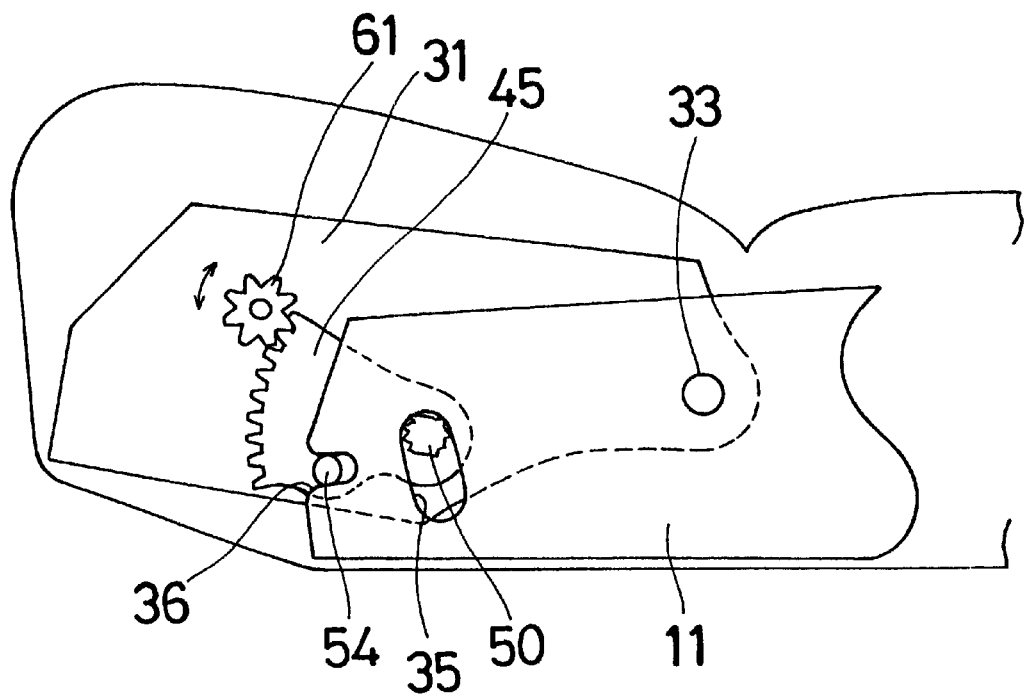
FIG. 5 is a side view of a portion of the seat assembly and vertical movement apparatus shown in FIG. 1 illustrating the vertical movement apparatus at its uppermost position.
Figure 6:
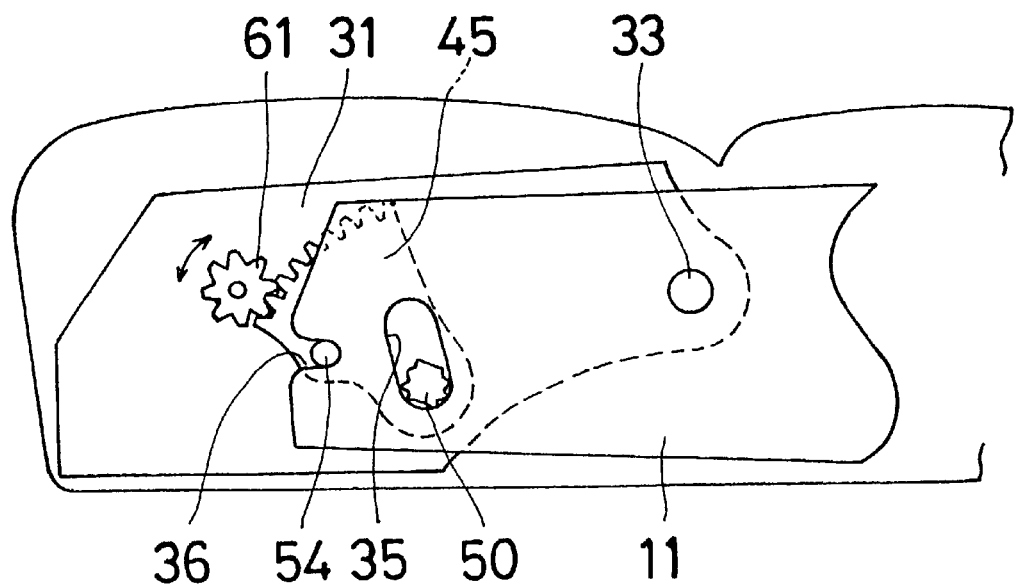
FIG. 6 is a side view of a portion of the seat assembly and vertical movement apparatus shown in FIG. 1 illustrating the vertical movement apparatus at its lowermost position.

The operation of the vertical movement apparatus 3 is as follows. FIG. 5 shows the vertical movement apparatus 3 adjusted to its highest position, and FIG. 6 shows the vertical movement apparatus 3 at its lowest position. When a passenger operates the handle 81 shown in FIG. 1, the pinion gear 61 is rotated or driven, thus causing the sector gear 45 to rotate relative to the vertical bracket 31. Because the sector gear 45 is rotatably held on the vertical bracket 31 by the connecting shaft 50, and the pins 54 fixed on the sector gear 45 and the arm link 44 are slidably engaged with the elongated holes 36 of the lower arms 11, the vertical bracket 31 can rotate around the hinge portion 33 and the front portion of the seat 1 can thus be adjusted upward or downward.

FIG. 8 shows another vertical movement apparatus 103 in accordance with the present invention. In this version of the present invention, a sector gear 154 and an arm link 144 are welded on the end portions of a connecting shaft 150 forming a slide member. The sector gear 154 and the arm link 144 are welded on the end portions of the connecting shaft 150 at positions spaced apart from the rotation holes 147 formed on the sector gear 154 and the arm link 144. The sector gear 154, the arm link 144 and the connecting shaft 150 are thus assembled or integrated as one part. Respective pins 154 extend through the rotation holes 147 and are positioned in respective holes 135 formed on a vertical bracket 131. Thus, one piece assembly formed by the sector gear 154, the arm link 144 and the connecting shaft 150 may swing with respect to the vertical bracket 131.

A braking mechanism 60 is installed on the vertical bracket 131 and possesses a pinion gear 61 that meshes with the sector gear 145. The vertical movement apparatus 103 is then assembled as a unit module. This unit module configuration permits an independent assembly process for the vertical movement apparatus 103 from the seat 1, in a manner similar to the above-described first embodiment of this invention. The unit module vertical movement apparatus 103 is attached to the seat 1 by engaging the connecting shaft 150 having a round cross section with grooves 136 formed on the front ends of both lower arms 111. These grooves 136 extend horizontally. The unit module vertical movement apparatus 103 is pivotally fastened to both of the side lower arms 111 by an appropriate connection mechanism such as pins 133b and screw (or nut) and washer members 131c so that the pins 133b pass through the holes 131a on the rear end portion of the vertical bracket 131 and the hinge holes 133a on the lower arm 111. The sector gear 145 and the arm link 144 are thus pivotally connected to the vertical bracket 131.

This second embodiment of the vertical movement apparatus also eliminates the need for a riveting process to attach the vertical movement apparatus 103 to the seat 1. Therefore, the time consuming assembly associated with repeatedly setting and changing the position of the large and heavy seat for carrying out the riveting of the many pins is eliminated. Thus, manufacturing costs can be reduced. The operation of this embodiment of the vertical movement apparatus is similar to that described above in connection with the first embodiment.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vertical movement apparatus comprising:
   a first bracket adapted to be secured on a floor side member;
   a second bracket pivotally connected to the first bracket to be adjustable relative to the first bracket;
   a sector gear pivotally mounted with respect to the second bracket for pivoting movement relative to the second bracket and disposed between the first bracket and the second bracket, the sector gear including a slide member engaging the first bracket; and
   a braking mechanism having a pinion gear meshing with the sector gear.

2. The vertical movement apparatus for a vehicle seat according to claim 1, wherein the sector gear is disposed on one side of the second bracket, and including an arm link disposed on an opposite side of the bracket, the arm link and the sector gear being connected by a connecting shaft.

3. The vertical movement apparatus for a vehicle seat according to claim 2, wherein the sector gear is rotatably supported by the connecting shaft on the second bracket.

4. The vertical movement apparatus for a vehicle seat according to claim 1, wherein the sector gear is disposed on one side of the second bracket, and including an arm link disposed on an opposite side of the bracket, the arm link and the sector gear being connected by the slide member.

5. The vertical movement apparatus for a vehicle seat according to claim 4, wherein the slide member is a connecting rod.

6. The vertical movement apparatus for a vehicle seat according to claim 1, wherein the first bracket and the second bracket are pivotally connected by pins.

7. The vertical movement apparatus for a vehicle seat according to claim 1, wherein the sector gear is disposed adjacent one side of the second bracket, and including an arm link disposed on an opposite side of the bracket, the arm link and the sector gear being connected by the connecting shaft.

8. The vertical movement apparatus for a vehicle seat according to claim 7, wherein the arm link includes a bushing having an inner splined surface and the connecting shaft has an outer splined surface that engages the inner splined surface on the arm link.

9. A vertical movement apparatus in a vehicle seat comprising:
   a first bracket adapted to be secured on a vehicle floor side member;
   a second bracket pivotally connected to the first bracket for pivoting movement relative to the first bracket;
   a rotatable sector gear mounted on a connecting shaft, the sector gear and the second bracket being pivotable relative to one another;
   a rotatable pinion gear meshing with the sector gear; and
   a portion of either the sector gear or the connecting shaft engaging the first bracket to prevent the sector gear from pivoting relative to the first bracket.

10. The vertical movement apparatus for a vehicle seat according to claim 7, wherein the sector gear includes a bushing having an inner splined surface and the connecting shaft has an outer splined surface that engages the inner splined surface on the bushing.

11. The vertical movement apparatus for a vehicle seat according to claim 9, wherein the first bracket and the second bracket are pivotally connected by pins.

12. The vertical movement apparatus for a vehicle seat according to claim 9, wherein a portion of the connecting shaft engages a pair of slots formed in the first bracket.

13. The vertical movement apparatus for a vehicle seat according to claim 9, wherein a portion of the sector gear engages a pair of slots formed in the first bracket, the portion of the sector gear including a pair of pins secured to the sector gear.

14. The vertical movement apparatus for a vehicle seat according to claim 9, wherein opposite end portions of the connecting shaft are positioned in arc-shaped slots in the first bracket.

* * * * *